Jan. 23, 1962          J. VAN POOL          3,018,310
CONTROL OF ALKYLATION OPERATION
Filed July 27, 1960
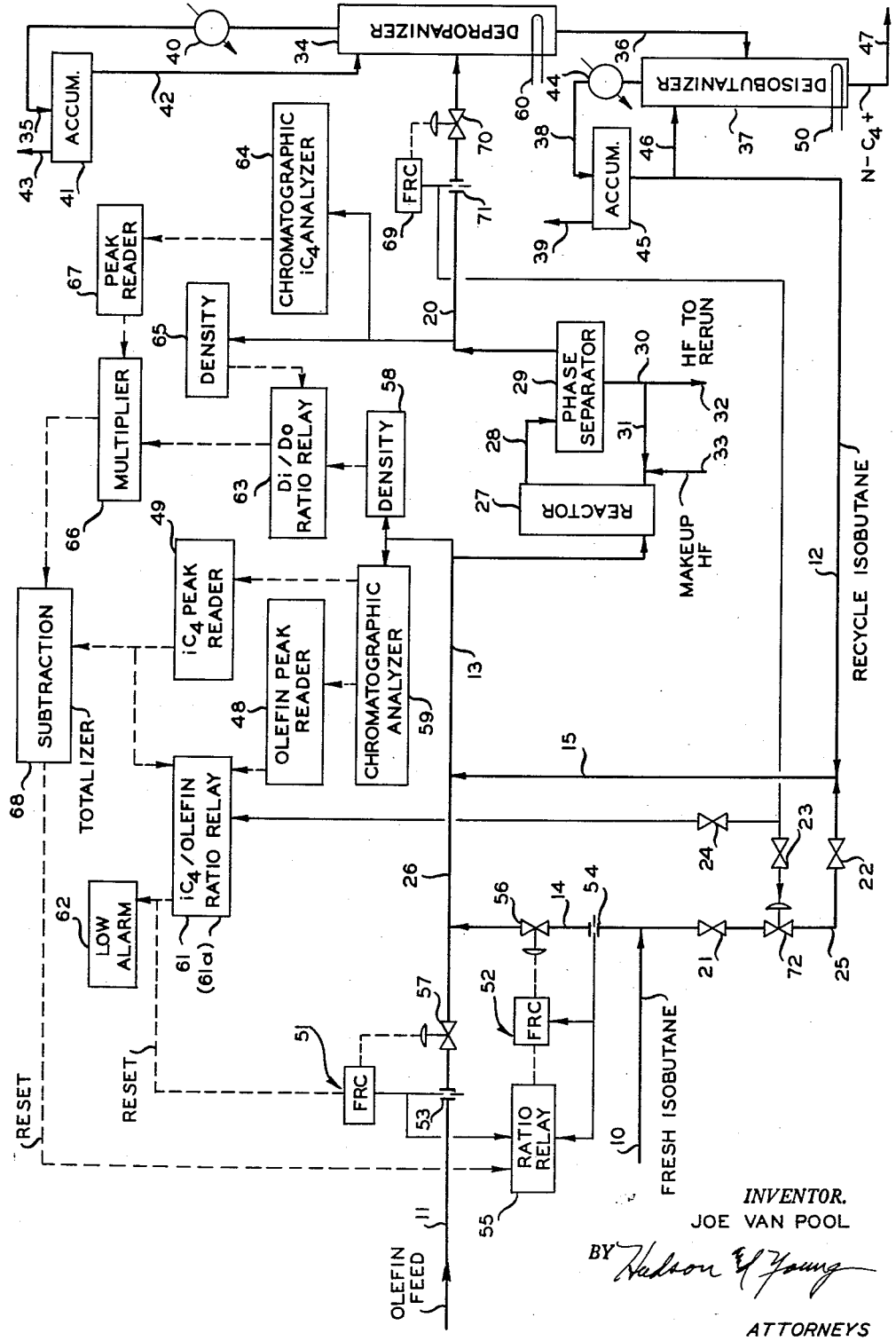
*INVENTOR.*
JOE VAN POOL
BY *Hudson E. Young*
*ATTORNEYS*

United States Patent Office 3,018,310
Patented Jan. 23, 1962

3,018,310
CONTROL OF ALKYLATION OPERATION
Joe Van Pool, Bartlesville, Okla., assignor to Phillips Petroleum Company, a corporation of Delaware
Filed July 27, 1960, Ser. No. 45,717
7 Claims. (Cl. 260—683.48)

This invention relates to control of an alkylation operation in which the distillation equipment used for separation of the reaction effluent is of limited capacity. In one aspect it relates to control of an alkylation operation wherein the distillation equipment used for separation of the reaction effluent is of limited capacity to maintain this distillation equipment operating at full capacity at all times. In another aspect it relates to control of an alkylation operation employing such a limited capacity distillation equipment with the elimination of column flooding and underloading. It further relates to control of an alkylation operation employing distillation equipment of limited capacity to maintain this distillation equipment just fully loaded in spite of operational variations tending to influence the volume of alkylation effluent charged to the distillation system.

Olefin-isoparaffin alkylator effluents frequently vary in volume due to one or more of many operational factors. When an alkylator effluent increases in volume because of an inadvertent increase in volume of olefin fed to the alkylator, the fractional distillation equipment following the reactor may become flooded because of the increased volume of the alkylate produced. Also, when an alkylate effluent decreases in volume as for example because of an inadvertent decrease in volume of olefin fed to the reactor, the volume of alkylation effluent passed to the fractional distillation equipment decreases and this latter equipment becomes underloaded. In this latter case full advantage of the capacity of the fractional distillation equipment is not taken. Also, alkylator effluent volumes can vary because of increased or decreased volume of the iso-paraffin in the charge stock thereto. Other operational irregularities, well known to those skilled in the alkylation art, occasionally occur and many of such occurrences cause variations in the flow of liquid effluent from the reaction system to the fractionation system. Such irregularities obviously can cause flooding or underloading of the distillation equipment.

An object of this invention is to provide automatic control of an isoparaffin-olefin alkylation operation. Another object of this invention is to provide automatic control of such an alkylation operation so as to provide effluent from the alkylator to be of as nearly constant volume as possible so as not to underload nor to flood the alkylate distillation equipment. Still another object of this invention is to provide feed to the alkylate distillation system at only full capacity rate of the distillation system and also to produce product alkylate having a maximum octane rating during operational regulation of the effluent alkylate to the distillation equipment.

Still other objects and advantages of this invention will be realized upon reading the following description which, taken with the attached drawing, forms a part of this specification.

The drawing represents a schematic arrangement of apparatus parts for practicing the control of this invention.

In the drawing reference numerals 10 and 11 identify conduits through which respectively isobutane-containing feed stock and olefin-containing feed stock are passed from sources, not shown, to this system. Isobutane stock passes from conduit 10 through a conduit 14 and joins the olefin feedstock from conduit 11 and the mixture passes on through a conduit 13 to a contactor 27. This alkylation contactor 27 and phase separator 29 are operated with hydrofluoric acid as an alkylation catalyst in a manner disclosed in U.S. Patent 2,881,235, issued April 7, 1959. While this patent discloses a process in which a mixed olefin stream containing propylene and butylenes is reacted with isobutane for the production of a mixed alkylate, the operating conditions involving the use of hydrofluoric acid as an alkylating catalyst are the same as when using only a single olefin hydrocarbon. For the present invention I will describe the process for controlling an alkylation reaction of butylene with isobutane. However, the reaction conditions are the same whether using a mixed olefin charge stock or a charge stock comprising substantially a single olefin.

From the contactor vessel 27 alkylator effluent passes through a conduit 28 into the phase separator vessel 29. In this vessel a heavy phase comprising hydrofluoric acid and a light hydrocarbon phase comprising alkylate and unreacted hydrocarbons separate. The heavy phase is withdrawn from this separator through a conduit 30 and is recycled through a conduit 31 to the contactor 27. A portion of the heavy phase can be withdrawn from conduit 30 through a conduit 32 for passage to a catalyst regeneration operation, if desired. A conduit 33 is provided for addition of makeup hydrofluoric acid from a source, not shown.

The light hydrocarbon alkylate phase from phase separator 29 is withdrawn therefrom and passed through a conduit 20 as feed material to a depropanizer column 34. This column is merely a fractional distillation column provided with conventional vapor-liquid contact promoting apparatus such as bubble cap trays. This fractional distillation column is operated in this case as a depropanizer column from which propane and lower boiling materials pass overhead through a conduit 35 and a condenser 40 to an accumulator vessel 41. In this operation all of the condensing that is required is for the provision of liquid for refluxing the depropanizer column 34. Liquid reflux is withdrawn from accumulator 41 and passed through a conduit 42 and added to the upper tray of the depropanizer column. Propane product from accumulator 41 is withdrawn through a conduit 43 for such disposal as desired, e.g. as liquefied petroleum gas. The bottoms liquid from depropanizer 34 is withdrawn through a bottoms withdrawal conduit 36 and is passed to a deisobutanizer column 37. This column is intended to recover the isobutane which did not react with the formation of a high octane number alkylate in the contactor vessel 27. This isobutane containing overhead material is passed from debutanizer column 37 through a conduit 38 and a condenser 44 to an accumulator 45. All of the isobutane from conduit 38 is intended to be condensed in condenser 44 for passage either through a conduit 46 as reflux to the column 37 or for recycling through a conduit 12 and conduit 15 into the original charge stock to the contactor 27. A valved conduit 39 is provided for pressure relief from accumulator 45 if and whenever necessary. The bottoms material from the deisobutanizer 37 is withdrawn through a conduit 47 and is the desired alkylate fraction of the process. This material finds special utility in the production of high octane number motor fuels.

The deisobutanizer column 37 is also provided with efficient vapor-liquid contacting apparatus such as bubble cap trays.

In this particular operation the depropanizer vessel 34 and the deisobutanizer vessel 37 are limited in capacity and it is necessary then to regulate the volume of liquid alkylate flowing through conduit 20 so as not to flood or to undercharge these two distillation vessels.

As is known in the isoparaffin-olefin alkylation art, it is advisable to maintain the isoparaffin concentration in the reacting material considerably higher than the olefin concentration. A ratio of isoparaffin to olefin is maintained at a value of from 10 or 12 to 1 in order to obtain optimum economic operations. In order to maintain such a ratio of feedstocks, some type of control is necessary. According to this invention I provide an analyzer apparatus 59 which for purposes of illustration is a chromatographic analyzer. Such an analyzer frequently is provided with recorder equipment and such a combination analyzer-recorder is fully described in U.S. Patent 2,875,606 and in a copending application, Serial No. 746,768, filed July 7, 1958. Such analyzers are based on the adsorption of components of a fluid stream in an adsorption column filled with such an adsorbent as silica gel, activated charcoal, or other suitable adsorbent. Such an analyzer-recorder provides a record of the concentration of each component in the sample passed therethrough. When the sample of fluid contains an olefin and an isoparaffin this analyzer-recorder transmits a first signal to a peak reader 49 which records the concentration of the isobutane and a second signal to a second peak reader 48 which records the concentration of the olefin. Suitable peak readers for use with a chromatographic analyzer-recorder are described in a co-pending application, Serial No. 727,606, filed April 10, 1958. The chromatographic analyzer of Serial No. 746,768, filed July 7, 1958, includes peak reader circuits so that a separate peak reader instrument is not required. In case two peak readers are required as in this present application, second peak reader circuits are built into the analyzer-recorder in a manner similar to those described in said co-pending application, Serial No. 746,768, filed July 7, 1958. In this particular case signals emerging from peak reader 49 are proportional to the concentration of isobutane in the gas stream being analyzed while signals emerging from peak reader 48 are proportional to the butylene content of the sample being analyzed. When the peak readers are separate instruments and are not constructed integral with the analyzer-recorder 59 peak readers described in co-pending application, Serial No. 727,606, filed April 10, 1958, can be used. In this latter application, a peak reader is described as being a separate instrument, and the operation thereof is described in conjunction with a chromatographic analyzer, however.

The use of chromatographic analyzers is described in this application merely as examples of analyzers suitable for the process being described. However, other suitable types of analyzers can be used, such as infrared analyzers, ultraviolet radiation analyzers, etc. However, when other types of analyzers are employed, peak readers such as peak reader 48 and 49 obviously are not required.

Signals from the olefin peak reader 48 and from the isobutane peak reader 49 are passed to an isobutane-butylene ratio relay 61. This ratio relay emits a signal proportional to the ratio of the concentration of isobutane to the concentration of the butylenes in the feed stream passing through conduit 13. This emitted signal from ratio relay 61 resets a set pointer of a recording rate of flow controller 51. This rate of flow controller includes a throttle valve 57 and an orifice plate assembly 53, these latter pieces of equipment communicate operatively with the recording-controlling portion of the instrument. While the rate of flow controller 51 is set to allow passage of the olefin feed stock at a predetermined rate this predetermined rate is reset in response to signals from the ratio controller 61. Thus, if the ratio of isoparaffin-to-olefin becomes too low, this ratio controller emits a signal proportional to the low ratio and resets the set point of the rate of flow controller 51 to decrease the rate of flow of olefins through conduit 11. Conversely, if the ratio relay 61 emits a signal proportional to an extremely high isobutane-to-olefin ratio, this high signal resets the set point to open throttle valve 57 and to permit passage of a greater proportion of olefin feed.

The rate of flow controller 51 regulates only the rate of flow of the olefin containing feed to this operation. Since it is important to maintain as nearly as possible a predetermined ratio of the rates of feeding of the isobutane to the butylene to this system, a second rate of flow controller 52 is provided and this rate of flow controller operates in conjunction with an orifice plate assembly 54 and a throttle valve 56 disposed in conduit 14 for regulation of the rate of flow of the isoparaffin. A volume ratio relay 55 is provided as illustrated in the drawing. This ratio relay communicates with the orifice plate assembly 53 in conduit 11 and with the orifice plate assembly 54 in conduit 14. This volume ratio relay sets a set point on the rate of flow controller 52 to regulate the volume of isobutane flowing through conduit 14 in response to the rate of flow of olefin feed stock through orifice plate assembly 53 in conduit 11. For example, when the volume ratio relay 55 is set at a ratio of for example, 10 to 1, that is, 10 volumes of isobutane feed stock to 1 volume of olefin feedstock, then as the flow of olefin feedstock through orifice plate assembly 53 increases, the ratio relay actuates the rate of flow controller 52, that is, resets its set point which in turn causes opening of the throttle valve 56 to allow introduction of a proportionately larger volume of fresh isobutane feedstock in order to maintain the same volume ratio of these materials.

In this general operation, assuming that all unreacted isobutane is recovered in the overhead of the deisobutanizer column 37 and is recycled to the alkylation contactor by way of conduits 12, 15, and 13, then the only fresh isobutane feed which is required to be added is that consumed in the alkylation operation in contactor 27. In order to provide a signal from the volume ratio relay 55 to the rate of flow control 52 for additional fresh isobutane feed an analysis of the hydrocarbon phase flowing through conduit 20 with respect to the isobutane content must be made.

An analyzer 64, which for purposes of illustration, is similar to analyzer 59, is provided in communication with conduit 20. This analyzer is adapted to analyze the stream of hydrocarbon phase from conduit 20 and is equipped with a peak reader 67 adapted to emit a signal proportional to the concentration of the isobutane in said hydrocarbon phase. This chromatographic analyzer and peak reader are similar to those hereinabove disclosed.

For use in final control of this operation a density sensing device 58 is operatively connected to determine or sense the density of the isobutane-butylene feedstock mixture passing through conduit 13. A suitable density sensing apparatus is described in the publication "Instruments for Measurement and Control" (1955), page 193, Reinhold Publishing Corporation, New York. This density sensing apparatus emits a signal proportional to the density of the mixed feedstock as stated. This signal is passed to a ratio relay 63. A second density sensing device 65, similar to that just mentioned, is operatively connected so as to sense the density of the hydrocarbon phase flowing through conduit 20. A signal emitted from density sensing device 65 is proportional to the hydrocarbon density and this signal is also transmitted to the ratio relay 63. This ratio relay 63 is of a type suitable for emitting a signal proportional to the density of the hydrocarbon feedstock in conduit 13 to the density of the hydrocarbon phase in conduit 20, i.e., proportion to the ratio of signals from the density sensing devices 58 and 65. The signal emitted from relay 63 proportional to this ratio is passed to a multiplier 66. Also, the signal from peak reader 67 which is proportional to the concentration of the isobutane in the hydrocarbon phase flowing through conduit 20 is also passed to the multiplier 66. This multiplier 66 is adapted to emit a signal proportional to the product of the signals from ratio relay 63 and peak reader 67. A multiplier suitable for the purpose at hand is described in Electronics, August 1956, page 182. Another suitable multiplier which can be used for multiplier 66 is described as a Sorteberg Force Bridge, type M force bridge multiplier as described in a brochure entitled New Force Bridge, in a brochure DH-3, Minneapolis-Honeywell Regulator Company, Industrial Division, Philadelphia 44, Pennsylvania. Either of these multipliers when suitably connected with ratio relay 63 and peak reader 67 emits a signal proportional to the product of the signals from relay 63 and from peak reader 67. This emitted signal is passed to a totalizer 68. This totalizer also receives a signal from peak reader 49 proportional to the concentration of the isobutane in the feedstock flowing through conduit 13. Totalizer 68 in this case is actually a subtraction unit and is one such as described in Foxboro Bulletin TI-37-57A, and manufactured by the Foxboro Company, Foxboro, Massachusetts. This subtraction unit subtracts the signal from multiplier 66 from the signal from peak reader 49 and emits a signal proportional to this difference to reset the set point of the volume ratio relay 55. This resetting of the set point of volume ratio relay 55 overrides the original setting of this volume ratio relay in order to regulate the rate of flow of fresh isobutane feed to the system in response to the isobutane consumed in the alkylation reaction. As will be realized by those skilled in such operational art, while the rate of flow of hydrocarbon phase through conduit 20 is relatively uniform, the isobutane separated in the deisobutanizer 37 and recycled through conduit 12 is not necessarily uniform. Since the depropanizer 34 and the deisobutanizer 37 are intended to operate at substantially full capacity a slight overloading or even underloading of these fractionators interferes with their optimum operation. For example, if some upset occurs in the operation of reboiler coil 60 in fractionator 34 then either some isobutane will be lost overhead from this vessel or some material boiling at a lower boiling point than isobutane will pass through conduit 36 with the bottoms product. If for example, some propane passes with the bottoms through conduit 36 this low boiling material will obviously pass overhead from the deisobutanizer and will be recirculated to the reactor. Such material may pass through the reactor 27 unaffected thereby giving an increased flow of alkylator effluent and accordingly increased flow of hydrocarbon phase through conduit 20 to the depropanizer 34. Thus, in this respect, depropanizer 34 can easily be overloaded. Also, if reboiler coil 60 overheats the kettle product in the depropanizer 34 an amount of the isobutane can easily be lost with the overhead product from this vessel. Thus in that respect the total amount of unreacted isobutane in the bottoms passing through conduit 36 is not available for recycling through conduit 12, conduits 15 and 13 to the reactor. In order to provide for a constant rate of passage of isobutane through conduit 15 for addition to the fresh charge stock from conduit 26, which is the normally used system, I provide a conduit 25 having manually operable valves 21 and 22 along with a throttle valve 72. By opening throttle valve 72 with manually operable valves 21 and 22 open an additional amount of fresh isobutane from conduit 10 is passed through conduit 25 and is added to that being recycled through conduit 12. Thus the amount or rate of flow of isobutane passing throttle valve 72 in conduit 25 is intended to make up any deficiency in the recycled isobutane so that the amount of fresh isobutane passing motor valve 56 can be exactly that consumed in the alkylation reaction. To control the motor valve 72 I provide a recording rate of flow controller apparatus 69 disposed operably in conduit 20. This rate of flow controller comprises an orifice plate assembly 71 and a throttle valve 70. The operation of this apparatus is such that upon an increase in volume flow through conduit 20 which increase in flow indicates a relatively large proportion of isobutane, the controller actuates the throttle valve 72 to throttle same thereby reducing the rate of addition of fresh isobutane through conduit 25 to be combined with the recycle isobutane.

When there is a change in the relative amount of isobutane or in the relative amount of the olefin in the feed to the alkylation reactor these variations are very quickly detected in the chromatographic analyzer and the variations are combined in ratio form in the ratio relay 61 which relay in turn resets the rate of flow controller 51 to reduce the rate of inlet of olefin feed when the olefin content in the feed entering the reactor is too high. As is known the olefin in the feed to the reactor determines the amount of alkylation reaction product formed because the concentration of the isoparaffin is maintained considerably higher than the concentration of the olefin so as to consume all of the olefin in the reactor to remove it from the reacted materials as quickly as possible thereby eliminating undesired side reactions. When the ratio relay 61 resets the rate of flow controller 51 to reduce or to increase the rate of flow of olefin this rate of flow of olefin is sensed through orifice plate assembly 53 to the ratio relay 55 which in turn regulates the rate of flow controller 52 for proper regulation of throttle valve 56 to obtain the ratio of isobutane to olefin required for the production of maximum octane number alkylate.

In a second embodiment of this invention conduit 25 with its throttle valve 72 are not employed. In this case for simplicity of drawing, manually operable valves 21, 22 and 23 have been provided for closing off this unnecessary or unused portion of the apparatus. Manually operable valve 24 is opened so that a signal emitted from orifice plate assembly 71 will be transmitted directly to the isoparaffin-olefin ratio relay 61a. For use in this embodiment the isoparaffin-olefin ratio relay apparatus has a set pointer so constructed that a signal from orifice plate assembly 71 will reset this set pointer to increase the isoparaffin-to-olefin ratio or to decrease same as required in response to the rate of flow of hydrocarbon phase through conduit 20 as sensed by the orifice plate assembly 71.

When the isobutane-olefin ratio relay 61a is used, as in the second embodiment, it has a set pointer which is reset on signal from the orifice plate flow sensing assembly 71.

Reference numberal 50 identifies the reboiler coil in the deisobutanizer 37.

An alarm apparatus 62 is provided to operate in conjunction with the isobutane-olefin ratio relay 61 and also 61a to indicate the condition in which the ratio of isobutane-to-olefin is at a predetermined undesirable low level. When the ratio is too low, undesirable side reactions might occur because not all of the olefin may be consumed in the desired alkylation reaction with the result that olefin polymers and the like might be formed. When this alarm sounds in case it is, for example, a sounding alarm, or if the light lights in case the alarm is, for example, a light, the operator at the instrument board notes that the ratio is too low and that some portion of the operation is out of line.

Advantages of this invention are numerous. For example, one advantage is that a maximum hydrocarbon charge is maintained to the fractionation system; that is, depropanizer 34 and deisobutanizer 37, at all times, to take full advantage of these fractionation facilities. Another advantage is that maximum recycle isobutane is used at all times resulting in the highest possible isobutane-to-olefin ratio for the production of the highest octane alkylate. Another advantage is that the amount of fresh isobutane added accounts for the isobutane consumed in the alkylation reaction and for the additional fresh isobutane added to the recycle isobutane at any time that the recycle isobutane is below normal in order to maintain the highest isobutane-to-olefin ratio and yet not to overload or flood the fractional distillation facilities.

Relative to the first embodiment of the invention described, the volume ratio relay 55 regulates the addition of makeup isobutane to replace that actually consumed in the alkylation reaction and flowing through conduit 14 in response to the olefin feed flowing through conduit 11. This ratio relay is on reset in response to the isobutane actually consumed in the reaction. The recycle isobutane flowing through conduit 12 from the deisobutanizer can vary in volume because of fractionator upset, along with changes in quality or isobutane content of the material charged to the system. This recycle isobutane in conduit 12 can also vary because of the removal from the system of some of the isobutane overhead from the deisobutanizer 37 for other uses since this isobutane material is relatively pure and in many cases has a higher isobutane content than the original feedstock to the system. The rate of flow controller 69 in conduit 20 is set for maximum allowable rate of flow to be charged to the fractionation system and the flow sensing device of this regulator adjusts valve 72 in conduit 25 for regulation of the fresh isobutane to maintain a relatively constant isobutane recycle added to the conduit 13.

Two isobutane analyzers, that is analyzer 59 and analyzer 64, are disposed with one on the charge to the reaction vessel 27 and the other on the reactor hydrocarbon effluent, transmit signals proportional to the isobutane content of these two streams. In the formation of alkylate from isobutane and olefin, both the volumes and mols decrease in the effluent stream. Thus densities of the reactor feed and reactor effluent are measured and the signals from these two density units proportional to the densities of the two streams are ratioed thus giving a signal proportional to the density of reactor charge to the density of the reactor effluent which transmitted signal is factored or multiplied by the signal from the reactor effluent isobutane analyzer signal which in turn returns the latter signal to the same weight basis of measurement as the reactor feed. Then, signals from the reactor feed isobutane analyzer and the corrected reactor effluent isobutane analyzer are subtracted to give a signal proportional to the actual isobutane consumed in the alkylation reaction. This latter signal is the "reset" signal for the ratio relay 55 on the olefin feed and the isobutane feed added, to make up for the isobutane consumed.

The olefin analyzer 59-peak-reader 48 on the reactor feed transmits its signal as does the isobutane analyzer 59-peak-reader 49 on the reactor feed to the isobutane-olefin ratio relay 61. The signal from this latter relay, at low level of isobutane-to-olefin ratio, resets the rate of flow controller 51 in the olefin feed line 11 to reduce the rate of flow of olefin in this line so as to increase the ratio of isobutane-to-olefin for the production of maximum octane alkylate.

In the second embodiment of this invention, that is when valves 21, 22 and 23 are closed and valve 24 is opened so that the isobutane-olefin ratio relay 61a is reset in response to the rate of flow of hydrocarbon phase in conduit 20 through the flow sensing portion 71 of the rate of flow control apparatus 69, the ratio relay 55 controls the ratio of the volumes of the fresh isobutane to the fresh olefin feedstock on reset of isobutane used in the reaction. It is intended in this embodiment that the rate of flow of recycle isobutane in conduits 12 and 15 is at the constant quantity and quality within reasonable limits. The reactor inlet analysis for the isobutane content of the feed stream gives a signal proportional to the isobutane content charged to the reactor. The reactor outlet hydrocarbon phase analysis corrected for density due to volume loss and mol loss from the reaction gives the isobutane content in the product flowing through conduit 20. The difference of the isobutane content in the feed stream to the reactor and the isobutane content of the product flowing through conduit 20 gives a signal from totalizer 68 proportional to the actual isobutane used in the reaction which signal resets or maintains fresh isobutane to olefin feed rate at the proper level to add fresh isobutane equal to that consumed in the reaction. The rate of flow controller apparatus 69 on the stream flowing through conduit 20 as charged material to the fractionation system allows maximum charge to the fractionation system. If this charge increases (flooding danger) this rate of flow controller resets the isobutane-olefin ratio in relay 61a to a lower value (highest usable) and the isobutane-olefin analyzer signal resets (decreases in this case) the quantity of olefin feed and the ratio relay 55 decreases the fresh isobutane feed while at the same set value which was set by the ratio relay 61a.

The following data illustrate the advantages of the operation of this invention specifically related to the first embodiment described hereinabove.

SPECIFIC EXAMPLE

A. *Original operation*

| Component/Stream | Barrels/hour | | | | | | |
|---|---|---|---|---|---|---|---|
| | 10 | 14 | 25 | 11 | 12 | 13 | 20 |
| Butylenes | | | | 20.00 | | 20.00 | |
| Isobutane | 10.94 | 10.94 | | 10.00 | 179.06 | 200.00 | 179.06 |
| Normal Butane | 1.00 | 1.00 | | 10.00 | 20.94 | 31.94 | 31.94 |
| Alkylate | | | | | | | 34.00 |
| Total | 11.94 | 11.94 | 0 | 40.00 | 200.00 | 251.94 | 245.00 |

Total to fractionation, b./h. (max.) _____ 245
$iC_4$/olefin volume ratio (max. possible) _____ 10:1
Octane (R.O.N. w./3 cc. TEL) of alkylate _____ 105.0

B. *Changed operation, corrected automatically by the invention. Changes occurred in olefin feed purity (increased), and amount of recycle isobutane (decreased)*

| Component/Stream | Barrels/hour | | | | | | |
|---|---|---|---|---|---|---|---|
| | 10 | 14 | 25 | 11 | 12 | 13 | 20 |
| Butylenes | | | | 26.00 | | 26.00 | |
| Isobutane | 35.68 | 18.36 | 17.32 | 7.00 | 155.84 | 198.52 | 173.16 |
| Normal Butane | 3.27 | 1.68 | 1.59 | 7.00 | 18.67 | 28.94 | 28.94 |
| Alkylate | | | | | | | 42.90 |
| Total | 38.95 | 20.04 | 18.91 | 40.00 | 174.51 | 253.46 | 245.00 |

Total to fractionation, b./h. (max.) _____ 245
$iC_4$/olefin volume ratio (max. possible) _____ 7.65
Octane (R.O.N. w./3 cc. TEL) of alkylate _____ 104.5

When olefin drops to, say 16, then ratio increases to, say 12, and yet produces 245 barrels to fractionator but makes less high octane number alkylate.

In the first tabulation given hereinabove it is noted that the total charge in barrels per day to the fractionation system is 245 barrels. This material is produced at an isobutane-olefin volume ratio (maximum possible) of 10 to 1. The research octane number with 3 cc. TEL of the finally produced alkylate is 105.0. Upon a change in operation corrected automatically by the apparatus of the invention is illustrated by the second tabulation of data above. Changes occurred in the olefin feed purity (increased) and the amount of recycle isobutane decreased. Upon analysis of the feed and product streams the isobutane-olefin volume ratio was reset to be 7.65 under condition that the butylene increased from 20 to 26 barrels per day, and the isobutane barrels decreased from 10 to 7. Under this automatically readjusted condition the isobutane-olefin volume ratio was automatically changed to 7.65 with the production of the same volume of alkylate for passing to the fractionators. The Research Octane Number with 3 cc. TEL of the alkylate was 104.5. Thus at the automatically corrected conditions the same volume of alkylate was produced for separation of products in the fractionation system but at the slightly lowered isobutane-to-olefin volume ratio the octane number of the finally produced alkylate was reduced from 105.0 to 104.5.

When the olefin content drops to, for example, 16, that is in the reverse direction to that illustrated in the second tabulation of data above, then the isoparaffin-to-olefin ratio increases to for example about 12, in place of the original 10 to 1, and yet the system will automatically produce 245 barrels of hydrocarbon phase to the fractionators with the production of the final alkylate bottoms from the deisobutanizer having an octane number somewhat slightly higher than the first given 105.0.

Another publication describing "high-speed chromatography in closed loop fractionator control' 'is given in ISA Journal, page 67 of the May 1960 issue. The chromatographic analyzer described in this publication as well as that heretofore referred to can be used in the apparatus described herein.

While certain embodiments of the invention has been described for illustrative purposes, the invention obviously is not limited thereto.

I claim:

1. A method for maintaining a uniform ratio of isoparaffin hydrocarbon to olefin hydrocarbon in the feed to an isoparaffin-olefin alkylation operation comprising mixing an isoparaffin hydrocarbon feed stock with an olefin hydrocarbon feed stock, passing this mixture into an alkylation zone maintained under isoparaffin-olefin alkylation conditions, withdrawing effluent from the alkylation zone and separating the withdrawn effluent into a heavy liquid phase and a hydrocarbon phase, feeding this hydrocarbon phase into a distillation zone and therein producing an unconverted isoparaffin hydrocarbon fraction and an alkylate fraction, adding this unconverted isoparaffin hydrocarbon fraction to the original isoparaffin hydrocarbon feed stock, adding additional isoparaffin hydrocarbon feed stock to the first mentioned fraction, determining the rate of feeding of said hydrocarbon phase into the distillation zone, upon sensing a decrease in said rate of feeding increasing the rate of adding of the additional isoparaffin hydrocarbon feed stock to said first mentioned fraction in response to the sensed decrease in said rate of feeding, and upon sensing an increase in said rate of feeding decreasing the rate of adding of said additional isoparaffin hydrocarbon feed stock to said first mentioned fraction thereby maintaining a uniform ratio of isoparaffin hydrocarbon to olefin hydrocarbon in the feed to the alkylation zone.

2. In an operation for producing alkylate from an isoparaffin hydrocarbon and an olefin hydrocarbon wherein a fractional distillation zone having a limited feed rate is provided for separation of an alkylate feed into fractions, a method for regulating the operation so as to provide effluent alkylate feed to this fractional distillation zone at said feed rate comprising separately providing an olefin hydrocarbon feed and an isoparaffin hydrocarbon feed, dividing this isoparaffin hydrocarbon feed into two portions, mixing one portion with the olefin hydrocarbon feed, passing this mixture into an alkylation zone maintained under isoparaffin-olefin alkylation conditions, withdrawing effluent comprising heavy liquid material and hydrocarbon from the alkylation zone, separating a heavy liquid phase and a hydrocarbon phase from said effluent, and passing this hydrocarbon phase to said distillation zone as said alkylate feed and therein separating unconverted isoparaffin hydrocarbon at a non-uniform rate and a fraction boiling below said isoparaffin hydrocarbon from an alkylate fraction, mixing the other portion of said isoparaffin hydrocarbon feed with the separated unconverted isoparaffin hydrocarbon, determining the rate of passage of said hydrocarbon phase to said distillation zone, upon sensing a decrease in said rate of passage of said hydrocarbon phase to said distillation zone below said limited feed rate increasing the volume ratio of said other portion to said one portion of isoparaffin hydrocarbon in response to the sensed decrease in said rate of passage of said hydrocarbon phase to said distillation zone, and upon sensing an increase in said rate of passage of said hydrocarbon phase to said distillation zone above said limited feed rate, decreasing the volume ratio of said other portion to said one portion of isoparaffin hydrocarbon in response to the sensed increase in said rate of passage of said hydrocarbon phase to said distillation zone and adding this mixed other portion of isoparaffin hydrocarbon and separated unconverted isoparaffin hydrocarbon to the first mentioned mixture whereby said limited feed rate to said distillation zone is maintained and a predetermined ratio of isoparaffin hydrocarbon to olefin hydrocarbon.

3. The operation according to claim 2 wherein the isoparaffin hydrocarbon is isobutane and the olefin hydrocarbon is butylene.

4. In an operation for producing alkylate from an isoparaffin hydrocarbon and an olefin hydrocarbon wherein a fractional distillation zone having a limited feed rate is provided for separation of an alkylate feed into fractions, a method for regulating the operation so as to provide effluent alkylate feed to said distillation zone at said feed rate and to produce simultaneously an alkylate fraction of the highest possible octane number comprising separately providing an olefin hydrocarbon feed and an isoparaffin hydrocarbon feed, mixing the olefin and isoparaffin feeds, passing this mixture into an alkylation zone maintained under isoparaffin-olefin alkylation conditions, withdrawing effluent comprising heavy liquid material and hydrocarbon from the alkylation zone, separating a heavy liquid phase and a hydrocarbon phase from said effluent, passing this hydrocarbon phase to said distillation zone as said alkylate feed and therein separating unconverted isoparaffin hydrocarbon and a fraction boiling below said isoparaffin hydrocarbon from an alkylate fraction, this latter being a product of the operation, passing a minor portion of the mixed feed into an analyzer and therefrom obtaining a first signal proportional to the isoparaffin hydrocarbon content of said mixed feed and a second signal proportional to the olefin hydrocarbon content of said mixed feed, determining the ratio of said first signal to said second signal, and regulating the ratio of the volume of the isoparaffin hydrocarbon feed to the volume of the olefin hydrocarbon feed mixed as above stated to obtain an alkylate product having a maximum octane number by regulating the volume of the olefin hydrocarbon feed mixed with the isoparaffin hydrocarbon, also passing a minor portion of said hydrocarbon phase into an analyzer and therefrom obtaining a third signal proportional to the isoparaffin content of said hydrocarbon phase, separately determining the density of said mixed olefin and isoparaffin feed and the density of said hydrocarbon phase and obtaining fourth and fifth signals proportional to the respective densities, determining the ratio of the density of the mixed feed to the density of said hydrocarbon phase and multiplying a signal proportional to the ratio of the densities by said third signal and thereby obtaining a sixth signal proportional to the product thereof, subtracting said sixth signal from said first signal and thus obtaining a seventh signal proportional to the difference, determining the rates of passage of said isoparaffin hydrocarbon feed and of said olefin hydrocarbon feed to the mixing step, and passing eighth and ninth signals proportional to said rates of passage of the isoparaffin hydrocarbon feed and of the olefin hydrocarbon feed to a ratio relay and therefrom obtaining a tenth signal proportional to the ratio of the eighth to the ninth signals and overriding the above regulation of the ratio of the volume of isoparaffin hydrocarbon feed to the volume of the olefin hydrocarbon feed mixed as above stated by regulation of the volume of isoparaffin hydrocarbon feed mixed with the olefin hydrocarbon feed as above stated whereby the optimum ratio control of isoparaffin to olefin is obtained with the production of said hydrocarbon phase of the above-stated feed rate and with the production of the above-mentioned alkylate fraction having a maximum octane number as product.

5. In the operation according to claim 4, determining the rate of flow of said hydrocarbon phase to the distillation zone and further regulating the volume of said olefin hydrocarbon feed to the mixing step in response to said rate of flow of said hydrocarbon phase to the distillation zone.

6. In an isoparaffin-olefin hydrocarbon alkylation system having first and second conduits for passage of the isoparaffin hydrocarbon feed and the olefin hydrocarbon feed, respectively, said conduits joining with a third conduit leading to an alkylation contactor, said contactor being provided with a fourth and outlet conduit communicating with a phase separation vessel, this vessel also being provided with a fifth and outlet conduit communicating with a fractional distillation column of limited capacity comprising, in combination, a first rate of flow controller in operative communication with said first conduit, a second rate of flow controller in operative communication with said second conduit, a first ratio relay in operative communication with the flow sensing portions of said first and second flow controllers, said first ratio relay operatively communicating with said first flow controller, a first analyzer means communicating operably with said third conduit, said first analyzer means being adapted to analyze a fluid from said third conduit for an olefin hydrocarbon and an isoparaffin hydrocarbon, a second ratio relay communicating operatively with said first analyzer and being adapted to emit a signal proportional to the ratio of concentrations of isoparaffin to olefin as determined by said first analyzer, said second ratio relay operatively communicating with said second flow controller to reset same, a second analyzer means communicating operatively with said fifth conduit, said second analyzer means being adapted to analyze a fluid from said fifth conduit for said isoparaffin hydrocarbon, first and second density indicating means operatively communicating with said third and fifth conduits, respectively, said first and second density indicating means being adapted to emit signals proportional to the density of fluids flowing through said third and fifth conduits, respectively, a third ratio relay operatively communicating with said first and second density sensing means and being adapted to emit a signal proportional to the ratio of the density indicated by the first density sensing means to the density indicated by the second density sensing means, a multiplier means operatively communicating with said third ratio relay and with said second analyzer and being adapted to emit a signal proportional to the product of the signals from said second ratio relay and said second analyzer, a subtracting relay operatively communicating with said first analyzer and with said multiplier means and being adapted to emit a signal proportional to the difference between signals from said first analyzer and said multiplier, said subtracting relay also operatively communicating with said first ratio relay and being adapted to reset the setpoint of said first ratio relay, a sixth conduit leading from said fractional distillation column to said third conduit for recycle of isoparaffin, a seventh conduit leading from said first conduit to said third conduit at a point intermediate the juncture of said first and second conduits with said third conduit and the point of communication of said first analyzer with the third conduit, a third rate of flow controller operatively in said fifth conduit and a throttle valve operatively in said seventh conduit, said throttle valve communicating operatively with the flow sensing portion of said third rate of flow controller and being adapted to open in response to a decrease of fluid flow in said fifth conduit and to throttle said valve in response to an increase of fluid flow in said fifth conduit below the flow corresponding to said limited capacity of said distillation column as sensed by the flow sensing portion of said third rate of flow controller.

7. In an isoparaffin-olefin hydrocarbon alkylation system having first and second conduits for passage of the isoparaffin hydrocarbon feed and the olefin hydrocarbon feed, respectively, said conduits joining with a third conduit leading to an alkylation contactor, said contactor being provided with a fourth and outlet conduit communicating with a phase separation vessel, this vessel also being provided with a fifth and outlet conduit communicating with a fractional distillation column of limited capacity comprising, in combination, a first rate of flow controller in operative communication with said first conduit, a second rate of flow controller in operative communication with said second conduit, a first ratio relay in operative communication with the flow sensing portions of said first and second flow controllers, said first ratio relay operatively communicating with said first flow controller, a first analyzer means communicating operably with said third conduit, said first analyzer means being adapted to analyze a fluid from said third conduit for an olefin hydrocarbon and an isoparaffin hydrocarbon, a second ratio relay communicating operatively with said first analyzer and being adapted to emit a signal proportional to the ratio of concentrations of isoparaffin to olefin as determined by said first analyzer, said second ratio relay operatively communicating with said second flow controller to reset same, a second analyzer means communicating operatively with said fifth conduit, said second analyzer means being adapted to analyze a fluid from said fifth conduit for said isoparaffin hydrocarbon, first and second density indicating means operatively communicating with said third and fifth conduits, respectively, said first and second density indicating means being adapted to emit signals proportional to the density of fluids flowing through said third and fifth conduits, respectively, a third ratio relay operatively communicating with said first and second density sensing means and being adapted to emit a signal proportional to the ratio of the density indicated by the first density sensing means to the density indicated by the second density sensing means, a multiplier means operatively communicating with said third ratio relay and with said second analyzer and being adapted to emit a signal proportional to the product of the signals from said second ratio relay and said second analyzer, a subtracting relay operatively communicating with said first analyzer and with said multiplier means and being adapted to emit a signal proportional to the difference between signals from said first analyzer and said multiplier, said subtracting relay also operatively communicating with said first ratio relay and being adapted to reset the setpoint of said first ratio relay, a sixth conduit leading from said fractional distillation column to said third conduit for recycle of isoparaffin, a third rate of flow controller operatively in said fifth conduit, the flow sensing portion of said third rate of flow controller communicating operatively with said second ratio relay and being adapted to reset the set point of said second ratio relay whereby upon sensing an increase in rate of flow of fluid in said fifth conduit greater than that corresponding to said limited capacity of said distillation column by the flow sensing portion of said third rate of flow controller, the set point of said second ratio relay is reset thereby resetting the set point of said first rate of flow controller to reduce the rate of flow of olefin hydrocarbon in said second conduit, and upon sensing a decrease in rate of flow of fluid in said fifth conduit less than that corresponding to said limited capacity of said distillation column by the flow sensing portion of said third rate of flow controller, the set point of said second ratio relay is reset thereby resetting the set point of said first rate of flow controller to increase the rate of flow of olefin hydrocarbon in said second conduit.

References Cited in the file of this patent
UNITED STATES PATENTS
2,881,235  Van Pool _____ Apr. 7, 1959